April 14, 1942.    J. HILGER ET AL    2,279,317
BATTERY MAKING METHOD
Filed Oct. 31, 1940
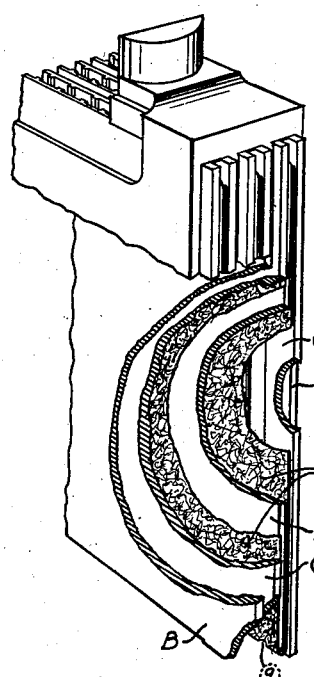
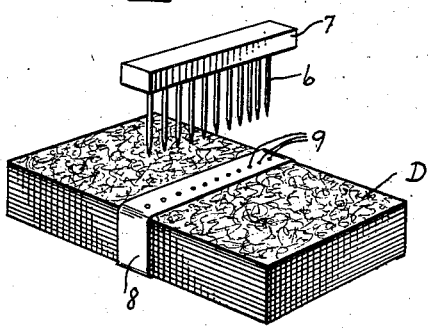
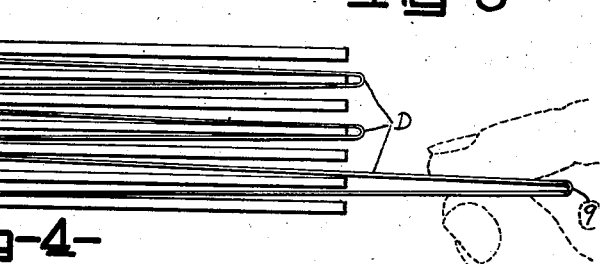
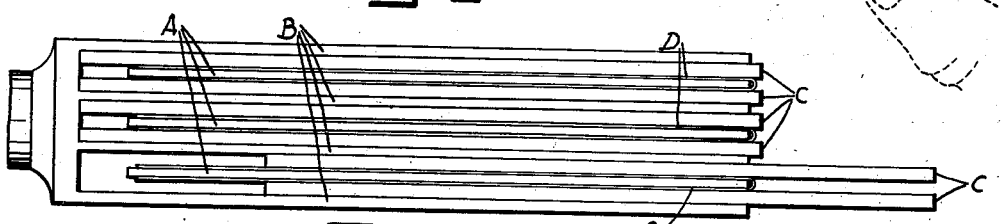
Inventor
JOHN HILGER
JAMES F. MACHOLL
By Carlsen and Hazle
Attorneys Patented Apr. 14, 1942

2,279,317

UNITED STATES PATENT OFFICE 2,279,317

BATTERY MAKING METHOD

John Hilger, Milwaukee, Wis., and James F. Macholl, Los Angeles, Calif., assignors, by mesne assignments, to Owens-Corning Fiberglas Corporation, Toledo, Ohio, a corporation of Delaware Application October 31, 1940, Serial No. 363,662

5 Claims. (Cl. 136—176)

This invention relates to the art of storage battery manufacture and the primary object is to provide improved means and methods to facilitate the insertion and assembling of certain battery parts. More specifically our invention concerns the matter of economically, efficiently and most effectively inserting oxide retainer mats between the positive plates and the separator elements of the current producing units, and particularly when such mats are made of spun glass as has been found very desirable in the battery industry, where the substance is frequently referred to as fiber glass.

Battery manufacturers are generally cognizant of the advantages flowing from the use of spun or fibered glass retention mats, and batteries utilizing the same are now available to the public. In brief, such mats, placed against both sides of the positive plates, function to trap the loosened particles of active material and hold them to the plate surface so as to prevent their falling to the cell bottom, while also being porous enough to permit the free vertical flow of battery fluid. This retention of the oxide keeps a maximum quantity thereof in service at all times and thereby extends the life of the battery and maintains its capacity at a high point of efficiency. It is also found that these mats also offer additional protection against short circuits.

The principal objection to the use of these mats resides in the difficulty of handling them and in properly inserting them in the plate assembly. If it is attempted to simply insert the mats edgewise between the spaced battery plates, either with or separately from the insertion of the separators it is found that they are not only difficult to handle but that they will wrinkle, buckle, or break, thus leaving parts of the plates exposed and increasing the mat thickness over other areas, or the mats will, even if properly maintained as units, be hard to properly locate with respect to the area of active material, and the incorrect placement thus results in substantial waste of material, particularly at what later becomes the upper edge of the plates as the mats are inserted between the under edges and are moved until they meet stops beyond the upper edges of the plates.

Attempts have been made to overcome these difficulties by securing the mats to the adjacent faces of the wood separators, so that the two can be inserted as one unit and with the relatively more rigid wood separators keeping the mats stretched and straight while they move into position. This process, while used in the industry, is objectionable for various reasons and particularly because of the time, labor, and expense required in glueing or otherwise tacking the mats and separators together. This method is also objectionable in that it requires insertion of the separator-mat units in the plate assembly shortly after the separators and mats have been secured together. The reason for this is that the required pre-soaking of the wood separators causes them to expand and if the glass mats are secured thereto while in that condition the units must be inserted before any contractions of the separators (by drying) and resulting wrinkling of the mats takes place, all of which circumstances preclude the possibility of preparing and storing the separator-mat units for future use and much in advance of the insertion step of that method.

By way of overcoming the foregoing objections to other methods and to greatly facilitate the accurate placement of mats in the battery we have developed a method or process which will now be described and which is illustrated in the accompanying drawing, wherein:

Fig. 1 is a perspective elevation of a battery cell plate group which has been constructed in accordance with our invention, with fractional portions broken away.

Fig. 2 is a perspective view of a package of glass fibre mats as prepared for shipment and perforated for subsequent use in our improved method.

Fig. 3 is a side elevation of a package such as shown in Fig. 2, but with the retention band removed and illustrating how the top sheets are successively removed by the operator when inserting them in the plate group unit.

Fig. 4 is a plan view of a plate group unit when resting on one side edge, as is done for this operation in the battery assembly line, and this view illustrates the method step of inserting the folded glass fiber mats.

Fig. 5 is similar to Fig. 4 except that it illustrates the succeeding step of inserting the separator plates.

The battery parts illustrated include the positive plates A and the negative plates B alternately arranged and mounted in relatively rigid relationship in the plate group in conventional manner; C designates the wood separators, placed between adjacent plates A and B and having a vertically corrugated face on the positive plate side.

The fiber glass mats, designated by the letter D, are not cut to the shape and size of the plates A—B as is done in the previously described methods, but as shown in Figs. 2 and 3, are cut in sheets just twice the required size, so that when the sheets are doubled across the center, and folded together they can be slipped over the positive battery plates as shown best in Fig. 4. When the wood separators are then inserted, as indicated in Fig. 5, they will not wrinkle or displace the mats, but rather the slight frictional face contact will tend to smoothen out the mats and properly move them into place, it being understood that the creased or joined edges of the mats will stop against the edges of the embraced positive plates as they can go no farther. In fact, with such positive stop means for properly positioning the mats it is possible to have them pre-cut to such dimensions that they need not even extend to the upper edge extremity of the positive plates but can be terminated slightly short thereof and at the level of the upper limits of the active material retained within the plate. Thus, we obtain maximum efficiency from the mat material while also obtaining maximum economy in the amount of fiber glass material required.

It will thus be seen that the use of folded double size mats, inserted in advance of the separators, eliminates displacement and wrinkling, and results in accurate placement and smoothening by the separators, thus greatly simplifying the previously described methods and resulting in marked advantages thereover.

Even our folding and inserting operation, however, gives rise to certain difficulties, and, as additional features of our invention, we have found ways of overcoming these difficulties as well. Thus if the double size glass sheet is to be accurately folded in the middle equipment must be provided either to mechanically fold the sheet or to guide the operator in doing so. Furthermore, mere folding per se is insufficient, at least unless the sheet is then also immediately inserted, because the glass fiber used in this mat material has a decided tendency to spring back to its initial position, or unfold; and if sufficient creasing pressure is applied to really maintain the fold then it is found that such pressure will have broken the relative brittle glass fibers and then the two mat sections of the sheet will no longer hang together. It is also found that the characteristics of this particular material render it extremely difficult to handle in sheet form by mechanical means. It is further found that if the material is to be folded by hand it cannot be pre-scored to aid the operator without breaking the fibers and separating the two mats.

We have, however, discovered that if the glass fiber sheets are perforated centrally, i. e., in the line of the fold, then such perforations will weaken the total tensile strength of the sheets on the fold line to such an extent that accurate folding is obtainable but without so breaking down the texture as to prevent the creased edge of the doubled sheet from properly engaging the positive plate to hold the mats while the separators are being inserted. The perforating process may consist of actually removing or punching out material to leave a row of holes, but we have found it sufficient, and in fact, preferable to punch the holes by merely piercing the mat package with a series of tines such as indicated at 6 in Fig. 2, these tines or pointed pins being secured in a block 7 mounted for vertical reciprocation in a punching machine of any suitable design. In this way a large number of mats can be perforated at one time and as shown in Fig. 2 the perforating operation can be effected without even removing the paper band 8 by which the mats are held together and in which they are received from the fiber glass processing factory. It will, of course, be understood that when the mats are to be perforated the package will be placed against suitable guides or stops in the punching machine so that the row of holes 9 will form an accurate division line midway between and parallel with the end edges of the sheets. Obviously a large supply of mats can be perforated far in advance of use, if desired, and it may here further be noted that this method of defining and weakening the fold line is accomplished far more economically and efficiently than scoring (assuming that to be otherwise practicable) because of the necessity, in scoring, of handling and operating on the sheets singly.

The operation of actually folding and inserting the mats is simple, yet effective and highly satisfactory. The plate group units are brought to the operator's table resting on one side edge, and with the alternate positive and negative plates secured in equally spaced parallel positions, as indicated in Fig. 4, and the package of double length but pre-perforated mats, from which the band 8 has been removed, is then placed in a convenient position on the work support so that the operator can pick up one mat at a time, from the top of the supply, as indicated in Fig. 3 and while doing so also folds the mat in two. While so holding it he then inserts it over a positive plate of the group unit, as shown in Fig. 4, and when the mats have all been inserted he, or another operator, then inserts the separator plates, as shown in Fig. 5, to complete the unit which then embodies the assembly characteristics more clearly evidenced by Fig. 1. As previously explained the inserting of the separator plates frictionally contacts the mats to move them accurately into final position, and under no circumstances causes wrinkling or shifting of the mats as has occurred heretofore.

The structural arrangement and novel characteristics and advantages of our battery, as such, when equipped with glass mats of the type herein set forth, form the subject for our divisional application Serial No. 384,332, filed March 20, 1941, for Battery.

It will be understood that suitable modifications may be made in the practice of this invention without departing from the spirit and scope of the appended claims. Having now, therefore, fully illustrated and described the preferred embodiment of our invention and the method of practicing the same in the practical art, what we desire to protect by Letters Patent and claim as our invention is:

1. The method of making a battery plate assembly which comprises mounting the positive and negative plates in alternate, spaced relations, inserting pairs of folded fiber-glass mat sheets in the assembly one sheet substantially over both sides of each positive plate with the fold extending about one edge thereof, and then inserting separator plates between the mats and the negative plates in frictional engagement therewith and in a direction tending to urge the folds of the mat sheets against said positive plate edges.

2. The method of inserting porous fiber glass mat sheets in a battery plate assembly having spaced plates, which comprises using mat sheets of approximately twice the length of one dimension of the plates, perforating the sheets along a fold line extending across the middle of the sheets, folding each of the sheets along said line to form two connected mats, one for each side of a plate, inserting the mats in the assembly with their free ends leading and so that the joined edges of each pair will be in position to pass around and stop against one edge of the plate, and then inserting separator plates in frictional contact with the mat sheet and by movements in the same direction as that in which the mats were inserted to move the mat into final position.

3. The method of making a battery plate unit assembly which comprises mounting a series of positive and negative plates in spaced, relatively fixed positions, folding rectangular sheets of fiber glass material to form pairs of connected mats, inserting the mats edgewise between the plates with the mats of each pair disposed substantially against opposite faces of a positive plate; inserting separator plates edgewise between the mats and negative plates into frictional engagement with the mats and negative plates and in a direction of movement the same as that followed when inserting the mats, and moving both mats and separators into the assembly until the connected edges of the mats stop against the enclosed edges of the respective plates, and thereby accurately locating the mats in predetermined positions against the plate surfaces.

4. The method of making a battery unit which comprises securing a series of battery plates in relatively spaced, parallel positions, providing fiber glass mat sheets in rectangular form each of a size not greater than the combined areas of both faces of one of the plates, weakening the total tensile strength of the fiber glass sheet along a fold line extending across each sheet between its end edges, folding each sheet on said fold line and inserting it, free edges first, into the unit, with one mat on each side of the same plate, and then inserting separator plates in the same direction of movement as the mats between the outer surfaces of each mat and the next adjacent battery plate and in frictional contact therewith, whereby the placement of the separator plates effects movements of the mat sheets into correct positions.

5. The method of making a battery unit which comprises assembling a series of alternately arranged positive and negative plates, securing the plates in spaced parallel positions, cutting fiber glass material into sheets of a width corresponding generally to one face dimension of a positive plate and of a length substantially twice the other face dimension of a positive plate, perforating the sheets along a line midway between their ends to facilitate folding each sheet to form two connected mats, inserting each pair of mats edgewise into the unit with one mat on each side of a positive plate, and so that the connected mat edges will be in position to stop against the enclosed positive plate edge to limit the mat movement and cause each mat to register with the face area of its adjacent plate, and then inserting separator plates edgewise between the outer mat surfaces and the adjacent negative plates and in frictional engagement with the mats and negative plates and by movements corresponding in direction to the insertion movements of the mats to move the mats completely into position.

JOHN HILGER.
JAMES F. MACHOLL.